United States Patent
Shah

(10) Patent No.: US 7,139,543 B2
(45) Date of Patent: Nov. 21, 2006

(54) DISTORTION REDUCTION IN A WIRELESS COMMUNICATION DEVICE

(75) Inventor: Peter Jivan Shah, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 204 days.

(21) Appl. No.: 10/066,072

(22) Filed: Feb. 1, 2002

(65) Prior Publication Data

US 2003/0148748 A1  Aug. 7, 2003

(51) Int. Cl.
*H04B 1/10* (2006.01)
(52) U.S. Cl. .................. 455/296; 455/278.1; 455/283; 455/295; 375/144; 375/148
(58) Field of Classification Search ................ 455/296, 455/1, 24, 63, 422, 575, 550, 278.1, 284, 455/295, 302, 305, 307, 63.1–63.2, 422.1, 455/67.11, 550.1, 283, 114.1, 114.2, 423, 455/424, 306, 575.1, 67.13, 425, 456.5, 456.6; 370/442, 478, 480, 503, 342, 343; 342/362, 342/16; 375/347, 103, 229, 144, 148, 285, 375/254, 278, 284
See application file for complete search history.

(56) References Cited

U.S. PATENT DOCUMENTS

| | | | | |
|---|---|---|---|---|
| 4,320,523 A | * | 3/1982 | Horikawa et al. .......... 375/103 |
| 4,480,236 A | * | 10/1984 | Harris ........................ 333/174 |
| 4,739,518 A | * | 4/1988 | Bickley et al. ............. 455/296 |
| 5,276,450 A | * | 1/1994 | Schwegman ................. 342/16 |
| 5,442,663 A | * | 8/1995 | Andersen et al. ........... 375/229 |
| 5,950,110 A | * | 9/1999 | Hendrickson ................ 455/1 |
| 5,982,825 A | * | 11/1999 | Tsujimoto ................... 375/347 |
| 6,215,812 B1 | | 4/2001 | Young et al. ............... 375/144 |
| 2002/0155812 A1 | * | 10/2002 | Takada ........................ 455/63 |

FOREIGN PATENT DOCUMENTS

| GB | 2343572 |   | 5/2000 |
|----|---------|---|--------|
| GB | 2343572 A | * | 5/2000 |

OTHER PUBLICATIONS

Demirkiran, I., et al. (1997) A knowledge-based interference rejection scheme for direct sequence spread-spectrum systems. IEEE: 120-124.

* cited by examiner

*Primary Examiner*—Edward F. Urban
*Assistant Examiner*—Charles Chow
(74) *Attorney, Agent, or Firm*—Philip Wadsworth; Charles D. Brown; Howard H. Seo

(57) ABSTRACT

The present invention provides a technique for cancellation of jammer signals in a radio frequency receiver. A radio frequency signal contains both a desirable signal and an undesirable jammer signal. The combined signal is processed with a filter (104) to extract only the undesirable jammer signal. The jammer signal is then added (104) back to the combined signal to effectively cancel the jammer signal. The system may be implemented using a feedforward approach or a feedback approach. The resultant clean signal is processed in a conventional manner.

25 Claims, 6 Drawing Sheets

DISTORTION REDUCTION IN A WIRELESS COMMUNICATION DEVICE

BACKGROUND

1. Field of the Invention

The present invention is related generally to wireless communication devices, and, more particularly, to a system and method for distortion reduction in a wireless communication device.

2. Description of the Related Art

The present invention provides this, and other advantages, as will be apparent from the following detailed description and the accompanying figures.

Wireless communication systems are proliferating as more and more service providers add additional features and technical capabilities. A large number of service providers now occupy a relatively limited portion of the radio frequency spectrum. Due to this crowding, increased interference between wireless communication systems is commonplace. For example, wireless communication systems from two different service providers may occupy adjacent portions of the spectrum. In this situation, interference may be likely.

One example of such interference occurs in a code division multiple access (CDMA) wireless system. In one embodiment, a CDMA system occupies a portion of the frequency spectrum adjacent to a portion of the frequency spectrum allocated to a conventional cellular telephone system, sometimes referred to as an advanced mobile phone system (AMPS).

Conventional CDMA units attempt to eliminate undesirable signals by adding filters following the mixer stage. FIG. 1 illustrates one known implementation of a direct-to-baseband or low IF wireless system 10 in which a radio frequency (RF) stage 12 is coupled to an antenna 14. The output of the RF stage 12 is coupled to an amplifier 16, which amplifies the radio frequency signals. It should be noted that the RF stage 12 and the amplifier 16 may include conventional components such as amplifiers, filters, and the like. The operation of these stages is well known and need not be described in greater detail herein.

The output of the amplifier 16 is coupled to a splitter 18 that splits the processed signal into two identical signals for additional processing by a mixer 20. The splitter 18 may be an electronic circuit or, in its simplest form, just a wire connection. The mixer 20 comprises first and second mixer cores 22 and 24, respectively. The mixers 22 and 24 are identical in nature, but receive different local oscillator signals. The mixer core 22 receives a local oscillator signal, designated LOI, while the mixer core 24 receives a local oscillator signal, designated as LOQ. The local oscillator signals are 90° out of phase with respect to each other, thus forming a quadrature mixer core. The output of the mixer 20 is coupled to jammer rejection filter stage 26. Specifically, the output of the mixer core 22 is coupled to a jammer rejection filter 28 while the output of the mixer core 24 is coupled to a jammer rejection filter 30. The operation of the jammer rejection filters 28 and 30 is identical except for the quadrature phase relationship of signals from the mixer 20. The output of the jammer rejection filters 28 and 30 are the quadrature output signals $I_{OUT}$ and $Q_{OUT}$ respectively.

The jammer rejection filters 28 and 38 are designed to remove unwanted signals, such as signals from transmitters operating at frequencies near the frequency of operation of the system 10. Thus, the jammer rejection filters 28 and 30 are designed to remove "out-of-band" signals. In operation, the jammer rejection filters 28 and 30 may be lowpass filters, bandpass filters, or complex filters (e.g., a single filter with two inputs and two outputs), depending on the implementation of the system 10. The operation of the jammer rejection filters 28 and 30 are well known in the art and need not be described in greater detail herein. While the jammer rejection filters 28 and 30 may minimize the effects of out-of-band signals, there are other forms of interference for which the jammer rejection filters are ineffective.

For example, distortion products created by the mixer 20 may result in interference that may not be removed by the jammer rejection filters 28 and 30. If one considers a single CDMA wireless unit, that unit is assigned a specific radio frequency or channel in the frequency spectrum. If an AMPS system is operating on multiple channels spaced apart from each other by a frequency $\Delta\omega_J$, then the second-order distortion from the mixer 20 will create a component at a frequency $\Delta\omega_J$ in the output signal. It should be noted that the second order distortion from the mixer 20 will create signal components at the sum and difference of the two jammer frequencies. However, the signal resulting from the sum of the jammer frequencies is well beyond the operational frequency of the wireless device and thus does not cause interference. However, the difference signal, designated herein as $\Delta\omega_J$, may well be inside the desired channel and thus cause significant interference with the desired signal.

In this circumstance, the AMPS signals are considered a jammer signals since they create interference and therefore jam the desirable CDMA signal. Although the present example refers to AMPS signals as jammer signals, those skilled in the art will appreciate that any other radio frequency sources spaced at a frequency of $\Delta\omega_J$ from each other may be considered a jammer.

If this second-order distortion signal is inside the channel bandwidth, the jammer rejection filters 28 and 30 will be ineffective and the resultant interference may cause an unacceptable loss of carrier-to-noise ratio. It should be noted that this interference may occur regardless of the absolute frequencies of the jammer signals. Only the frequency separation is important if the second-order distortion results in the introduction of an undesirable signal into the channel bandwidth of the CDMA unit.

Industry standards exist that specify the level of higher order distortion that is permitted in wireless communication systems. A common measurement technique used to measure linearity is referred to as an input-referenced intercept point (IIP). The second order distortion, referred to as IIP2, indicates the intercept point at which the output power in the second order signal intercepts the first order signal. As is known in the art, the first order or primary response may be plotted on a graph as the power out ($P_{OUT}$) versus power in ($P_{IN}$) In a linear system, the first order response is linear. That is, the first order power response has a 1:1 slope in a log-log plot. The power of a second order distortion product follows a 2:1 slope on a log-log plot. It follows that the extrapolation of the second order curve will intersect the extrapolation of the fundamental or linear plot. That point of intercept is referred to as the IIP2. It is desirable that the IIP2 number be as large as possible. Specifications and industry standards for IIP2 values may vary from one wireless communication system to another and may change over time. The specific value for IIP2 need not be discussed herein.

It should be noted that the second-order distortion discussed herein is a more serious problem using the direct down-conversion architecture illustrated in FIG. 1. In a conventional super-heterodyne receiver, the RF stage 12 is coupled to an intermediate frequency (IF) stage (not shown). The IF stage includes bandpass filters that readily remove the low frequency distortion products. Thus, second-order distortion is not a serious problem with a super-heterodyne receiver. Therefore, the IIP2 specification for a super-heterodyne receiver is generally not difficult to achieve. However, with the direct down-conversion receiver, such as illustrated in FIG. 1, any filtering must be done at the baseband frequency. Since the second-order distortion products at the frequency separation, $\Delta\omega_J$, regardless of the absolute frequency of the jammers, the IIP2 requirements are typically very high for a direct-conversion receiver architecture. The IIP2 requirement is often the single most difficult parameter to achieve in a direct down-conversion receiver architecture.

As noted above, the second-order distortion is often a result of non-linearities in the mixer 20. There are a number of factors that lead to imbalances in the mixer 20, such as device mismatches (e.g., mismatches in the mixer cores 22 and 24), impedance of the local oscillators, and impedance mismatch. In addition, factors such as the duty cycle of the local oscillator also has a strong influence on the second-order distortion. While various calibration schemes may be effective to reestablish symmetry in the mixer 20, this calibration is time-consuming and will vary from one wireless unit to the next due to component variations. Such time-consuming calibration processes are expensive do not lend themselves well to high-volume production since the calibration must be done initially at the factory and may require periodic recalibration during normal use.

In addition to the calibration difficulties, the undesirable second-order products are generally quite low relative to the desired signal and are thus not directly measurable. All these factors lead to difficulty in reducing the second-order distortion products to an acceptable level. Therefore, it can be appreciated that there is a significant need for a system and method for wireless communication that reduces the undesirable distortion products to an acceptable level. The present invention provides this and other advantages as will be apparent from the following detailed description and accompanying figures.

BRIEF SUMMARY

The present invention is embodied in a system and method for the reduction of distortion in a wireless communication circuit. The wireless communication circuit has a combined signal that includes a desired signal and a jammer signal. The system comprises a filter to remove the desired signal and thereby provide a filtered signal representative of the jammer signal and an adder circuit that receives the combined signal and the filtered signal to thereby remove the jammer signal.

The system may be implemented using a feedback approach or a feedforward approach. In the feedback implementation, a radio receiver receives the radio frequency signal at a selected radio frequency. The received RF signal contains the desired signal and the jammer signal. A mixer core converts the received RF signal to a selected lower frequency. The filter operates at the selected lower frequency to remove the desired signal. An up-mixer is coupled to the filter to convert the filtered signal to the selected radio frequency. The adder operates at the radio frequency to remove the jammer signal from the combined radio frequency signal.

In the feedforward system a conventional radio receiver receives the radio frequency signal at a selected radio frequency. The received RF signal contains both the desired signal and the jammer signal. A conventional mixer core converts the received RF signal to a selected processing frequency. In this implementation, the invention comprises a down-mixer to convert the received RF signal to a selected lower frequency with the filter operating at the selected lower frequency to remove the desired signal. The system further comprises an up-mixer coupled to the filter to convert the filtered signal to the selected radio frequency. The adder operates at the selected radio frequency to remove the jammer signal and generate an output signal that is coupled to the mixer core. In this manner, the undesirable jammer signal is eliminated prior to processing by the mixer core.

Both the feedback and feedforward implementations may be implemented in a quadrature system. In a quadrature implementation, the filter is implemented as first and second filter portions that generate first and second quadrature components, respectively. In the feedback system, the up-mixer comprises first and second quadrature up-mixers to convert the first and second filtered signal portions to the selected radio frequency. The quadrature system also includes a summer coupled to the first and second quadrature up-mixer portions to combine the converted first and second signal portions.

In a quadrature implementation of the feedforward system, the down-mixers comprise first and second down-mixer portions to convert the received radio frequency signal to first and second quadrature components at the selected lower frequency. The first and second filter portions filter the first and second quadrature components and the up-mixer comprises first and second up-mixer portions to convert the first and second filtered quadrature signal portions to the selected radio frequency. The system also includes a summer coupled to the first and second quadrature up-mixer portions to combine the converted first and second signal portions.

In one implementation, the filter operates at baseband frequencies to allow direct conversion from the selected radio frequency to baseband. The filters may be implemented as analog filters. In one implementation, the filter is a high-pass filter. The wireless communication unit has the specified operational bandwidth and the filter bandwidth may be based on the operational bandwidth.

DETAILED DESCRIPTION OF THE EMBODIMENTS

Figure 2:
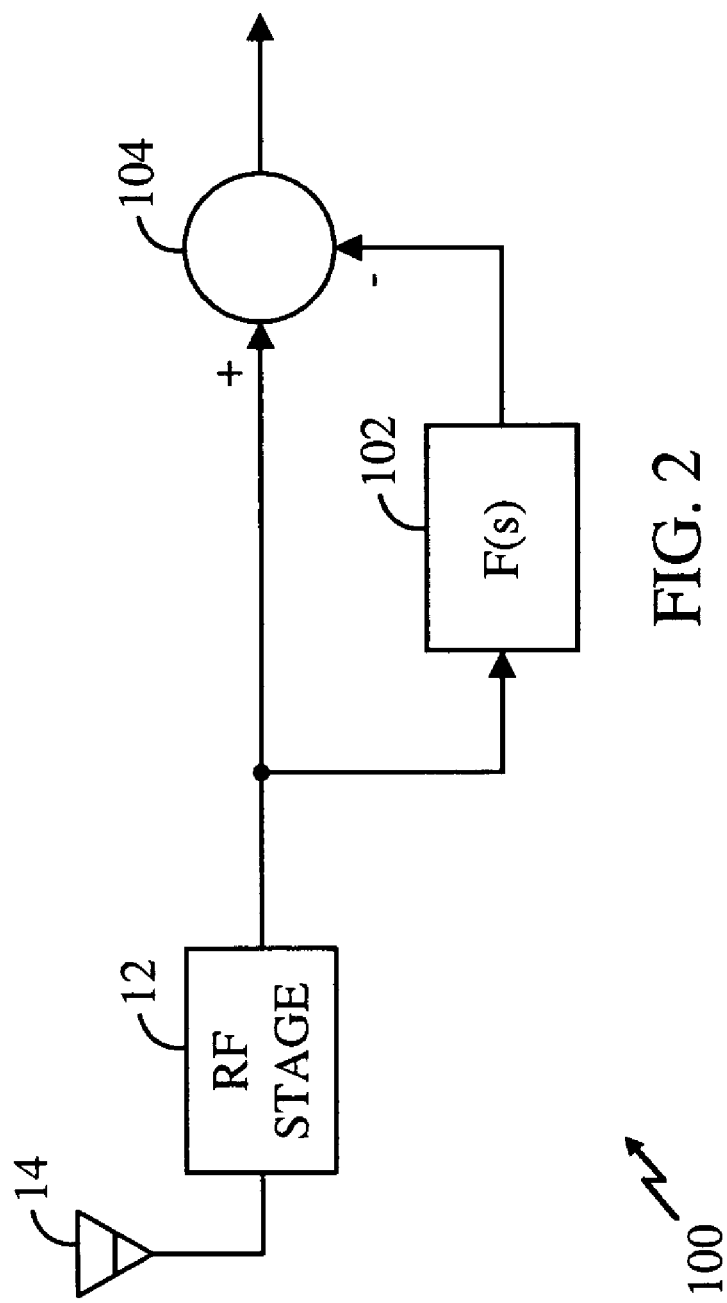
FIG. 2 is a functional block diagram of a generic implementation of the present invention.

The present invention is directed to a system architecture that actively cancels out the undesirable portions of the signals, which may be referred to herein as jammer signals. Although different implementations may be used, the underlying principle is best illustrated in the functional block diagram of FIG. 2 where a system 100 implements the present invention. The RF stage 12 and antenna 14 are conventional components that need not be described in greater detail herein. A filter 102 having a filter function F(s) serves to remove the desirable portion of the received signal. Details of the filter 102 will be provided below.

The output of the filter 102 is the undesirable jammer signal. The output of the filter 102 (i.e., the jammer signal) is combined with the output of the RF stage 12 by an adder 104. A positive input of the adder 104 is coupled to the output of the RF stage 12 while a negative input of the adder is coupled to the output of the filter 102. The adder 104 functions as a differential circuit and canals the undesirable signal that is present at both the positive input and the negative input of the adder. The output of the adder 104 contains only the desirable signal and thus the undesirable jammer signal has been effectively removed.

Figure 3:
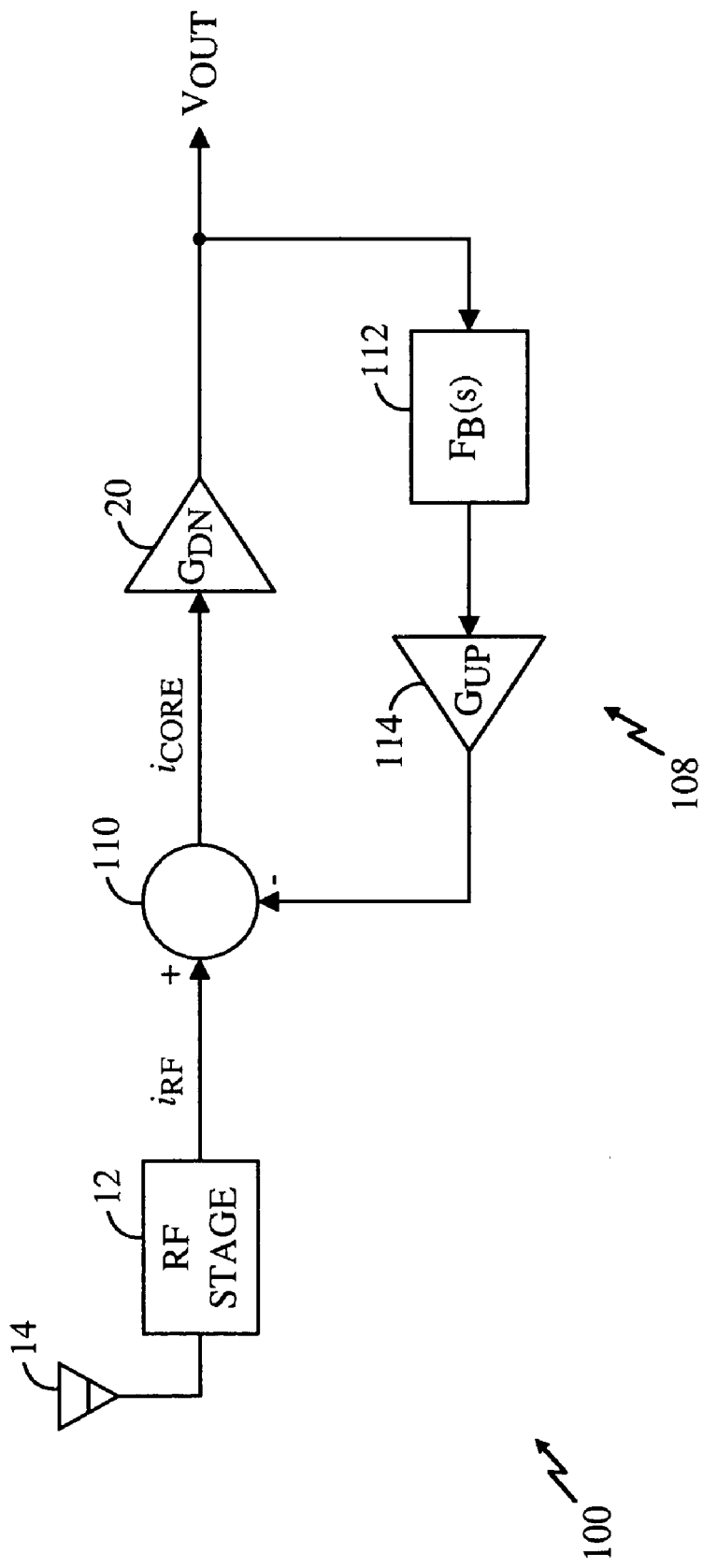
FIG. 3 is a functional block diagram of one implementation of the receiver of the present invention.
Figure 5:
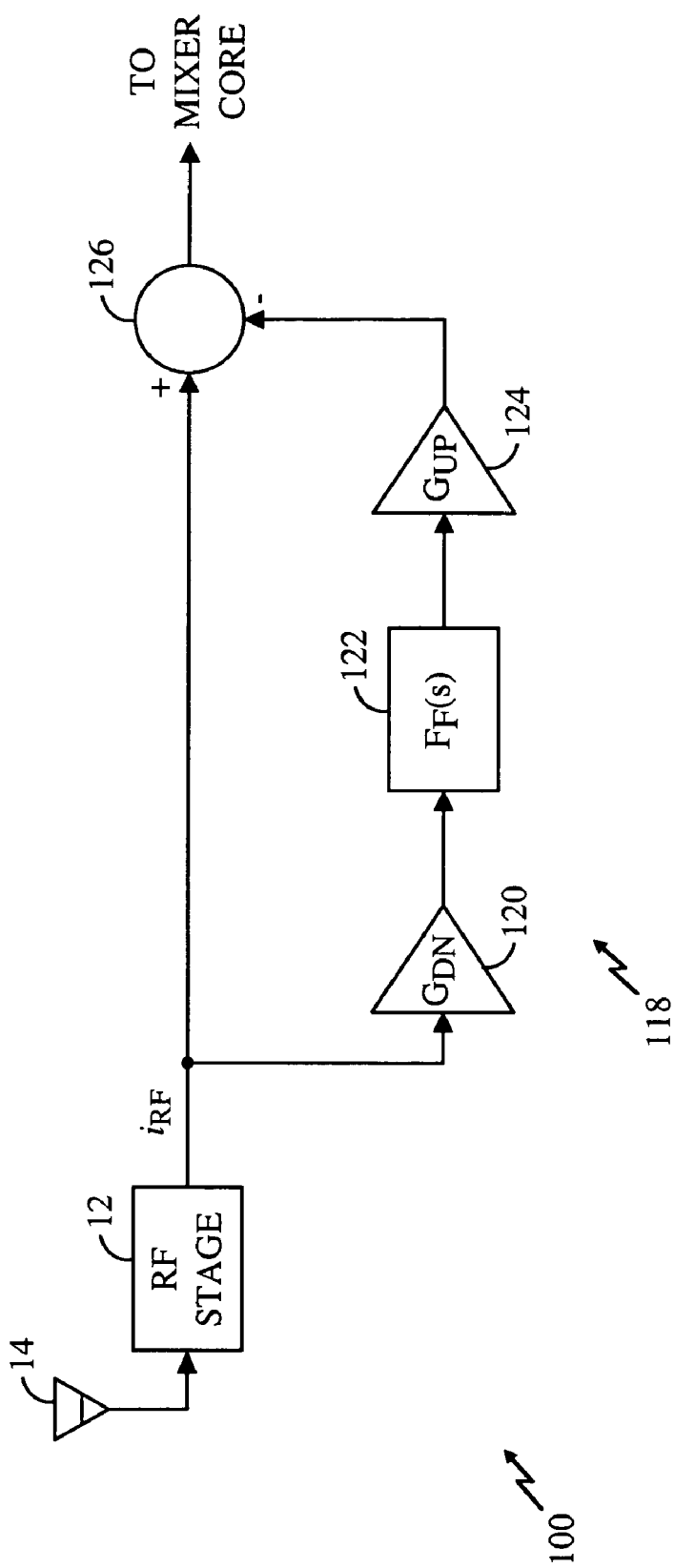
FIG. 5 is a functional block diagram of an alternative implementation of the present invention.

The system 100 may be implemented in a feedback mode, illustrated in the function block diagram of FIG. 3, or in a feedforward mode as illustrated in the function block diagram of FIG. 5. In the feedback embodiment of the system 100, the undesirable signal from jammers is canceled out using a feedback circuit 108. In the feedforward embodiment, illustrated in the functional block diagram of FIG. 5, the undesirable signal from jammers is canceled out using a feedforward circuit 118.

With reference to FIG. 3, a simplified functional block diagram of the system 100 models the signal response to permit the filter characteristics to be determined. The implementation illustrated in FIG. 3 includes the RF stage 12 and the antenna 14, which operate in a conventional manner. The output of the RF stage is a signal designated herein as $i_{RF}$, which coupled to the input of the adder 110. The output of the adder 110, which is designated as $i_{CORE}$, is coupled to the mixer 20. In the small signal analysis, the mixer 20 has a transfer function designated as $G_{DN}$.

The output of the mixer 20 is coupled to a feedback filter 112. The feedback filter 112 provides a measure of jammer signals. The characteristics of the feedback filter 112 are derived below. The output of the feedback filter 112 is coupled to an up-mixer 114, which has a transfer characteristic designated as $G_{UP}$. The output of the up-mixer 114 is coupled to the negative input of the adder 110 to subtract the effects of the jammers in front of the mixer 20. In this way, the jammers are effectively canceled before they enter the mixer 20.

Figure 4:
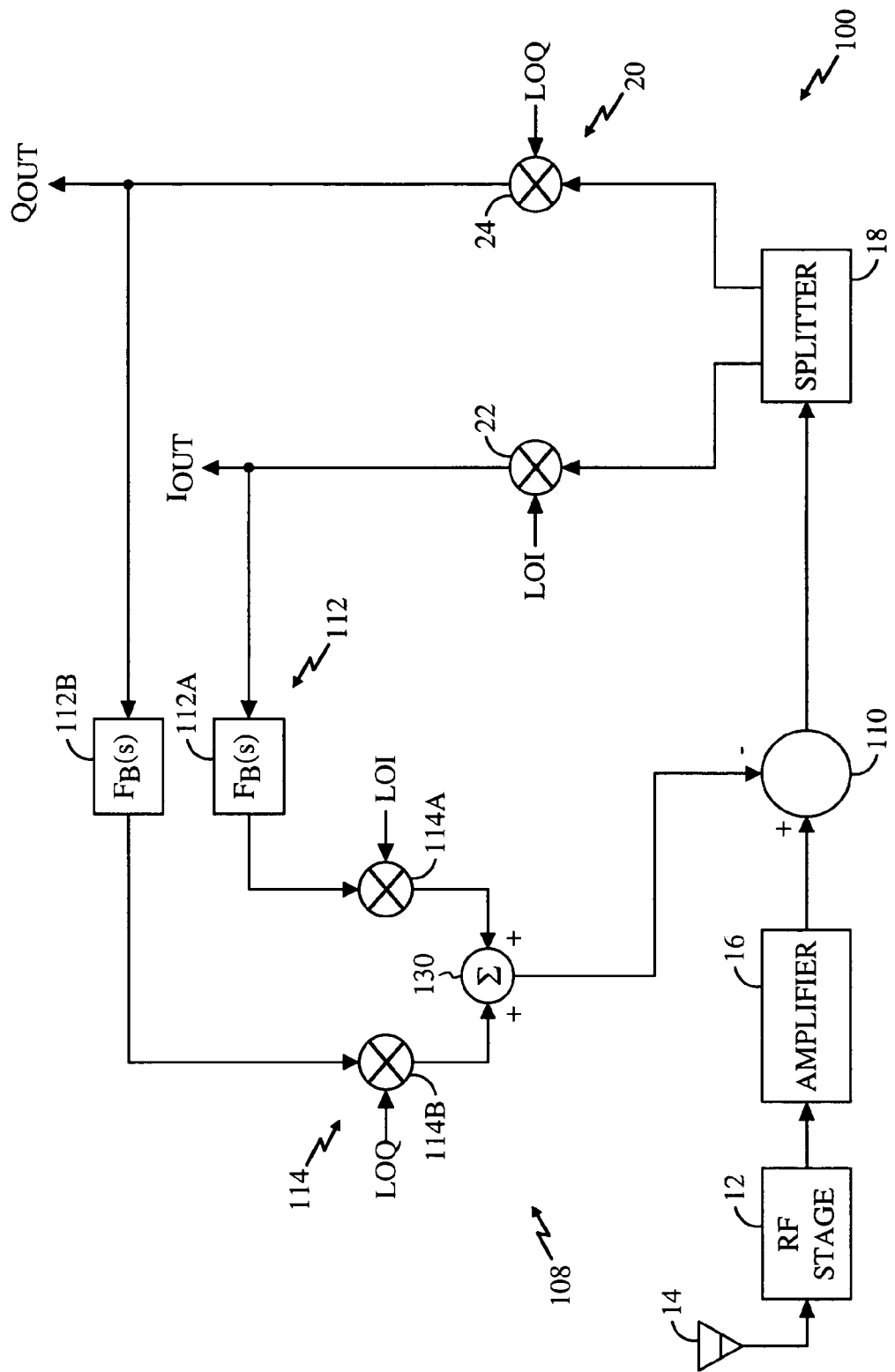
FIG. 4 is a more detailed functional block diagram illustrating the operational characteristics of the system of FIG. 3.

FIG. 4 provides an example implementation of the feedback implementation of the system 100 shown in FIG. 3. The operation of the RF stage 12, antenna 14, and amplifier 16 operate in a known manner and need not be described in greater detail herein. The output of the amplifier 16, which contains both the desired signal and the jammers, is coupled to the positive input of the adder 110. The negative input of the adder 110 receives a signal from the feedback circuit 108 and contains a measure of the jammer only. That is, the desirable signal has been removed by the feedback filter 112. The output of the adder 110 is coupled to the splitter 18. As previously discussed, the splitter operates in a conventional manner to split the received signal into two identical signals for coupling to the quadrature elements of the mixer 20. One signal from the splitter 18 is coupled to the input of the mixer core 22, which also receives an input signal from a local oscillator designated as LOI. Similarly, the other signal from the splitter 18 is coupled to the input of the mixer core 24, which receives a local oscillator signal designated as LOQ. As is known in the art, the local oscillators LOI and LOQ have identical frequencies, but are 90° out of phase with respect to each other thus producing quadrature outputs from the mixer cores 22 and 24.

The output of the mixer core 22 is designated as $I_{OUT}$ while the output of the mixer core 24 is designated as $Q_{OUT}$. These two signals are processed in a conventional manner to decode the signal received by the system. The additional data processing steps required to decode the transmitted signal are known in the art and need not be described in any detail herein.

The output signals from the mixer cores 22 and 24 are also each provided to feedback filters 112a and 112b, respectively. Each of the feedback filters 112a and 112b function in the manner illustrated in the simplified functional block diagram of FIG. 3, but for different quadrature components. FIG. 3 is a small signal model of the circuit operation wherein $$\frac{V_{OUT}}{i_{RF}} = \frac{G_{DN}}{1 + G_{DN} G_{UP} F_B(s)}$$

wherein $V_{OUT}$ is the output signal from the mixer 20 and $i_{RF}$ is the baseband equivalent of the actual signal current from the RF stage 12. The term $G_{DN}$ and $G_{UP}$ represent the transfer functions of the mixer 20 and the up-mixer 114, respectively, while $F_B(S)$ is the Laplace transform representation of the feedback filter 112.

The current $i_{RF}$ is the baseband equivalent of the signal provided as the positive input to the adder 110 while the output signal from the adder 110 is shown as $i_{CORE}$, which is a baseband equivalent of the actual signal from the adder 110 to the mixer 20. The function of the adder 110 may be illustrated by the following:

$$\frac{i_{CORE}}{i_{RF}} = \frac{1}{1 + G_{DN} G_{UP} F_B(s)}$$

where all terms are previously defined. If H(g) is the desired baseband filtering, then the transfer function of the filter may be represented by the following:

$$H(g) = \frac{1}{1 + G_{DN} G_{UP} F_B(s)}$$

where all terms have been previously defined.

It is desirable to make $i_{CORE}$ much smaller than $i_{RF}$ at the jammer frequencies. This can be accomplished by making the product $G_{DN} G_{UP} F_B(s)$ large at these jammer frequencies. At the desired receive frequencies, it is desirable to have the value $F_B(s) \cdot 0$. The resultant filter transfer characteristics of the feedback filters 112a and 112b remove the desired signal and thus provide a measure of the jammer signals. The feedback filters 112a and 112b may be implemented as conventional analog filters using known techniques. In an exemplary embodiment, the feedback filters 112 may be implemented as analog transconductance active high-pass filters whose cut-off frequency is selected to be half the channel bandwidth specified for the system 100. As those skilled in the art can appreciate, the system 100 is operating at a selected radio frequency and has a bandwidth determined by industry standards and regulatory bodies, such as the Federal Communications Commission (FCC). The specific radio frequency and channel bandwidth depend on the specific implementation.

Alternatively, the feedback filters 112a and 112b may be implemented digitally using, by way of example, a digital signal processor (not shown). Those skilled in the art can alter the system 100 to accommodate various implementations of different radio frequencies and different channel bandwidths. In this manner, signals within the channel bandwidth are attenuated while signals outside the channel bandwidth, including jammer signals, are allowed to pass. Thus, the output signal from the feedback filter 112 is a measure of the jammer signal with the desired signal within the bandwidth having been removed by the filtering action. Returning again to FIG. 4, the outputs from the feedback filters 112 are coupled to the up-mixer 114. Specifically, the output of the feedback filter 112a is coupled to the input of an up-mixer 114a, which also receives a signal from the local oscillator LOI. Similarly, the output of the feedback filter 112b is coupled to the input of an up-mixer 114b, which also receives a signal from the local oscillator LOQ. The output of the up-mixers 114a and 114b are at the original radio frequency from the RF stage 12. The outputs of the up-mixers 114a and 114b are combined by a summer 130. The output of the summer 130 is provided as the feedback signal to the negative input of the adder 110. Thus, the feedback circuit comprising the feedback filter 112, up-mixer 114, and summer 130 provide a signal representative of the jammer signals. By coupling these signals to the negative input of the adder 110, the undesirable jammer signals are effectively removed from the combined signal containing the desired signal and the jammers. This effectively cancels the jammer signals before they enter the mixer 20.

It should be noted that the second-order intermodulation products from the up-mixer 114 are non-critical in the present evaluation because they lie far away from the radio frequency at which the system 100 operates. It should be further noted that the embodiment illustrated in FIG. 4 uses a direct-to-baseband signal processing technique, which eliminates the requirement of an IF stage. As previously noted, a super-heterodyne receiver using an IF stage includes bandpass filters that can be used to minimize the second order distortion. However, the system 100 can be applied to a receiver system having a low IF frequency. In this implementation, the high-pass filter functions of the feedback filter 112 are replaced with a somewhat more complex bandpass filter centered around the selected intermediate frequency.

FIG. 5 is a functional block diagram illustrating a feedforward technique for implementing the system 100. In this implementation, the output of the RF stage 12 is coupled to a down-mixer 120, which mixes the RF signal down to baseband or to some selected intermediate frequency. A feedforward filter 122 filters out the desired RF signal and thus provides a measure of the jammers. An up-mixer 124 mixes the measure of the jammer signal back to original radio frequency. The output of the up-mixer 124 is coupled to a negative input of an adder 126. The output of the RF stage, which contains both the desired signal and the jammer signal, is coupled to a positive input of the adder 126. The presence of the jammer signal at the negative input of the adder 126 effectively cancels out the contribution of the jammer signal. Thus, the output of the adder 126 contains only the desired signal. The output of the adder 126 is coupled to the mixer 20 for processing in the conventional manner. Thus, in both the feedback and feedforward approaches, the RF signal is a combination of the desired signal and the jammer signal. The combination signal is filtered to remove the desired signal and thereby provide a measure of the jammer signal. The jammer signal is coupled to the negative input of an adder to effectively remove the undesirable jammer signal from the combination signal.

Figure 6:
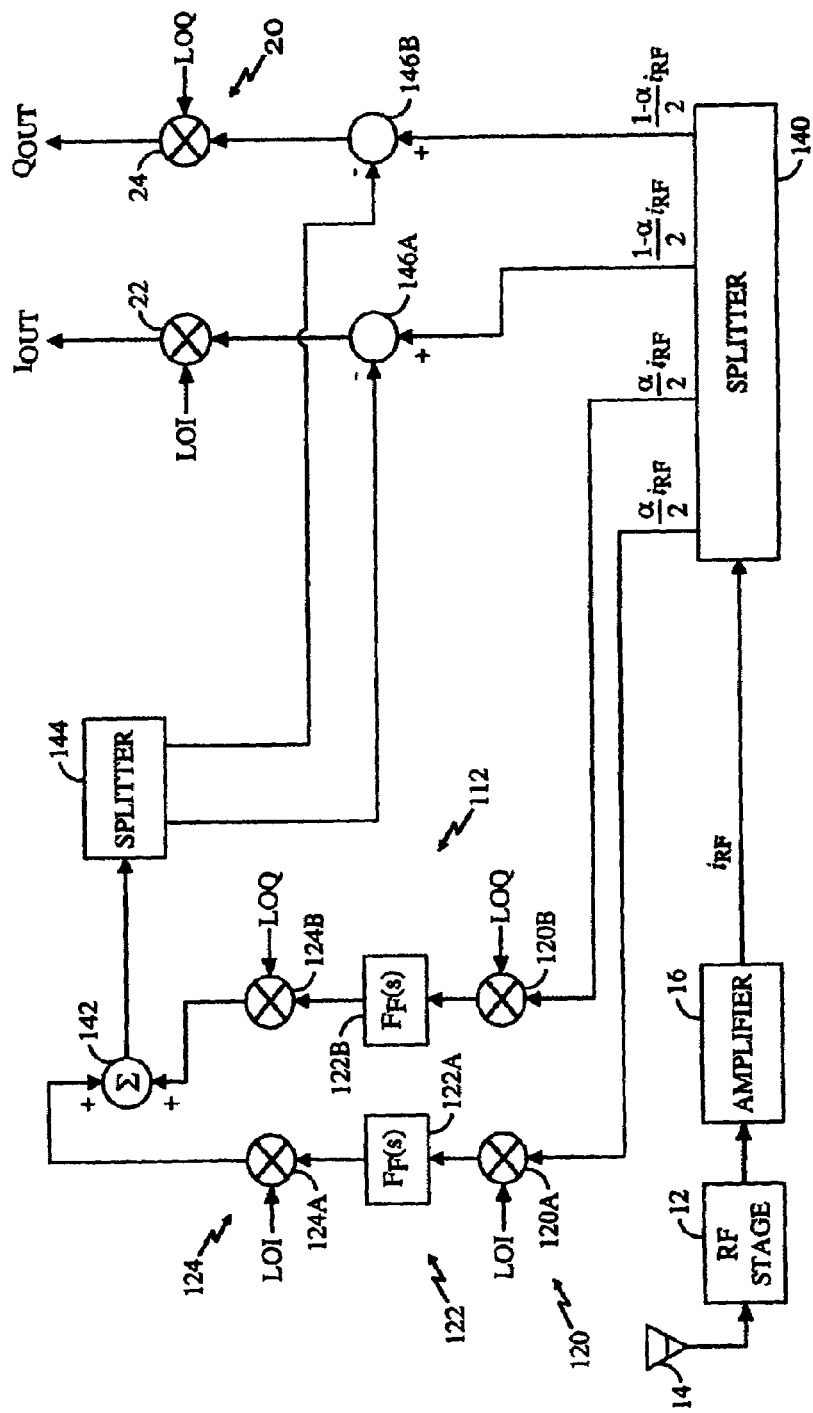
FIG. 6 is a more detailed functional block diagram illustrating the operational characteristics of the system of FIG. 5.

An exemplary implementation of the feedforward embodiment of the system 100 is illustrated in the functional block diagram of FIG. 6. The RF stage 12, antenna 14, and amplifier 16 function in a conventional manner, as previously described. The output signal from the amplifier is coupled to a splitter 140. Although the splitter 140 operates in fundamentally the same fashion as the splitter 18 (see FIGS. 1 and 5), the splitter 140 receives the input signal $i_{RF}$ and splits it into four signals. Two identical signals from the splitter 140 are routed to the feedforward circuit 118 while the remaining two signals from the splitter are routed to the mixer 20 via other circuit components that will be described in detail below.

The identical signals from the splitter 140 to the feedforward circuit 118 have a value of $$\frac{\alpha}{2} \times i_{RF}$$

where $\alpha \leq 1$. Thus, the signals provided to the feedforward circuit 118 are proportional to the input signal $i_{RF}$. The identical signals routed from the splitter 140 to the mixer 20 each have a value of $$\frac{1-\alpha}{2} \times i_{RF}.$$

The feedforward circuit 118 comprises the down-mixer 120, feedforward filter 122, and up-mixer 124. The signals $$\frac{\alpha}{2} \times i_{RF}$$

from the splitter 140 are coupled to the down-mixer 120. Specifically, one of the identical signals $$\frac{\alpha}{2} \times i_{RF}$$

from the splitter 140 is coupled to the input of a mixer 120a, which also receives a signal from the local oscillator LOI. Similarly, the other of the identical signals $$\frac{\alpha}{2} \times i_{RF}$$

from the splitter 140 is coupled to the input of a mixer 120*b*, which also receives a signal from the local oscillator LOQ. The output of the down-mixer 120*a* is coupled to a feedforward filter 122*a* while the output of the down-mixer 120*b* is coupled to the input of a feedforward filter 122*b*.

In an exemplary embodiment, the feedforward filters 122*a* and 122*b* are high-pass filters with a cutoff frequency selected to match half the channel bandwidth for the system 100. As discussed above with respect to feedback circuit 108, the feedforward filters 122 may be implemented as analog transconductance active high-pass filters. In the embodiment where the down-mixers 120 mix directly down to baseband, the feedforward filters 122 are high-pass filters having the characteristic described above. If the down-mixers are mixed to an intermediate frequency, the feedforward filters 122 may be somewhat more complex bandpass filters centered around the selected IE. Alternatively, the feedforward filters 122 may be implemented in digital form using, by way of example, a digital signal processor (not shown).

The output of the feedforward filter 122 is coupled to the up-mixer 124. Specifically, the output of the feedforward filter 122*a* is coupled to an input of an up-mixer 124*a*, which also receives a signal from the local oscillator LOI. Similarly, the output of the feedforward filter 122*b* is coupled to an input of an up-mixer 124*b*, which also receives a signal from the local oscillator LOQ. The up-mixers 124*a* and 124*b* convert the filtered signal back to the original radio frequency. The outputs from the up-mixers 124*a* and 124*b* are combined by a summer 142 to thereby produce a signal representative of the jammers.

The output of the summer 142 is coupled to a splitter 144. The splitter 144 operates in a conventional manner to split the combined signal from the summer 142 into two identical signals. Each of the identical signals will be routed to negative inputs of adders for subsequent quadrature processing. Specifically, one of the identical signals from the splitter 144 is coupled to a negative input of an gadder 146*a*. The positive input of the adder 146*a* receives a signal from the splitter 140 containing both the desired signal and the jammer signal. In contrast, the signal from the splitter 144 contains only the jammer signal, thus effectively canceling out the jammer signal from the combined signal and producing an output which contains only the desired signal.

Similarly, the other identical output signal from the splitter 144 is coupled to a negative input of an adder 146*b*. The positive input of the adder 146*b* receives a signal from the splitter 140 containing both the desirable signal and the jammer signal. In contrast, the signal from the splitter 144 contains only the jammer signal. The adder 146*b* effectively cancels the effects of the jammer signal and produces and output containing only the desired signal.

The outputs from the adders 146*a* and 146*b* are coupled to the mixer 20. Specifically, the output of the adder 146*a* is coupled to an input of the mixer core 22, which also receives a signal from the local oscillator LOI. The mixer core 22 produces the output signal $I_{OUT}$, which contains only the desired signal with the jammer signal having been effectively canceled by the adder 146*a*.

Similarly, the output of the adder 146*b* is coupled to an input of the mixer core 24, which also receives a signal from the local oscillator LOQ. The output of the mixer core 24 is the output signal $Q_{OUT}$, which contains only the desired signal with the jammer signal having been effectively canceled by the adder 146*b*. Thus, the jammer signals are effectively canceled before any processing by the mixer 20. The clean signals (i.e., containing only the desirable signal) are provided from the outputs of the adders 146*a* and 146*b* to the mixer cores 22 and 24, respectively. The mixer cores 22 and 24 operate in a conventional manner to produce the outputs $I_{OUT}$ and $Q_{OUT}$. Subsequent processing of the clean signals occurs in a conventional manner that need not be described in greater detail herein.

The system 100 is thus capable of effectively canceling the undesirable jammer signals using a variety of system architectures. Although the system 100 is particularly useful for direct-to-baseband conversion, it may also be implemented in receiver systems with an IF stage. In the direct-to-baseband implementation, the system 100 provides significantly improved IIP2 performance. In a CDMA implementation, the IIP2 performance of the system 100 exceeds industry standards for IIP2.

Although the techniques described above improve the IIP2 response characteristics, it may also improve most other types of distortion. This is true because jammers are effectively removed from the mixer 20 and therefore any distortion products they might generate within the mixer are also removed. The distortion is thus largely determined by the up conversion mixers (e.g., the mixer 114 of FIG. 4 and the mixer 124 of FIG. 6). In the case of even-order distortion (e.g., the IIP2 distortion measurement), the up conversion mixers (e.g., the mixers 114 and 124) produce distortion products that are far away from the selected RF and thus cause no problem. In the case of odd-order distortion (e.g., the IIP3 distortion measurement), the distortion products from the up conversion mixers will be close to the desired RF frequency and may fall inside the desired receive channel. However, those skilled in the art will appreciate that up converters can usually be made more linear than down converters therefore a lower overall distortion can be achieved.

Figure 1:
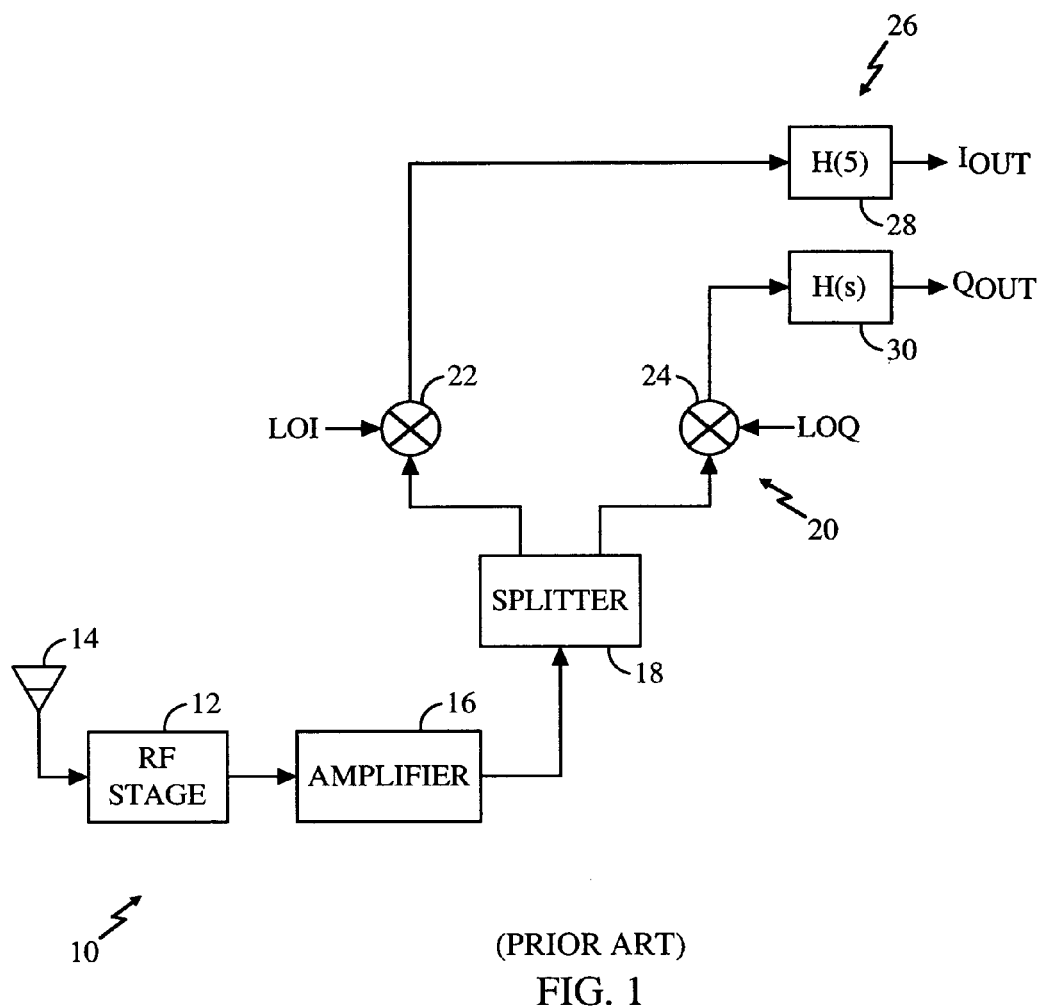
FIG. 1 is a functional block diagram of a conventional wireless communication receiver.

An additional advantage can be realized in the fact that the jammers at the output of the mixer 20 are greatly attenuated when compared with the output of the mixers in the known implementation illustrated in FIG. 1. As a result, it is possible to achieve much higher signal levels of the desired channel at the output of the mixer 20 since it is no longer necessary to accommodate high jammer levels at that point in the processing circuit. This, in turn, greatly reduces the necessary dynamic range of subsequent signal processing circuitry.

It is to be understood that even though various embodiments and advantages of the present invention has been set forth in the foregoing description, the above disclosure is illustrative only, and changes may be made in detail, yet remain within the broad principles of the invention. Therefore, the present invention is to be limited only by the appended claims.

What is claimed is:

1. A system for the reduction of distortion in a wireless communication circuit having an RF combined signal including a desired signal and an out of band jammer signal, comprising:

a down mixer in a feedforward path configured to frequency convert at least a portion of the RF combined signal to substantially a baseband signal;

a filter in the feedforward path coupled to the down mixer and configured to remove the desired signal from the baseband signal and thereby provide a filtered signal representative of the jammer signal;

an up mixer in the feedforward path coupled to the filter and configured to frequency convert the filtered signal to an upconverted filtered signal at substantially an RF frequency of the jammer signal;

an adder circuit to receive the combined signal and the upconverted filtered signal from the feedforward path to thereby remove the jammer signal therefrom, wherein the adder circuit comprises a positive and negative input, the combined signal being coupled to the positive input and the upconverted filtered signal being coupled to the negative input; and a signal mixer coupled to an output of the adder circuit.

2. The system of claim 1, wherein the wireless communication circuit is a quadrature circuit and the down mixer is a quadrature mixer core, the filter comprising first and second filter portions to filter first and second quadrature components, respectively, and thereby generate first and second filtered signal portions, respectively, the up-mixer comprising first and second quadrature up-mixer portions to convert the first and second signal portions to substantially the frequency of the jammer signal, and a summer coupled to the first and second quadrature up-mixer portions to combine the converted first and second signal portions.

3. The system of claim 1 wherein the filter comprises a high-pass filter.

4. The system of claim 1 wherein the filter is an analog filter.

5. The system of claim 1 wherein the wireless communication unit has a specified operational bandwidth and the filter has a filter bandwidth based on the operational bandwidth.

6. A circuit for the reduction of distortion in a communication circuit having an RF combined signal including a desired signal and an out of band jammer signal, comprising:

means, in a feedforward path, for down converting at least a portion of the combined signal from RF to substantially a baseband combined signal;

means, in the feedforward path, for filtering the baseband combined signal to remove the desired signal and thereby provide a filtered signal representative of the jammer signal;

means, in the feedforward path, for up converting the filtered signal to an upconverted filtered signal at substantially a radio frequency of the jammer signal;

means for adding the combined signal and the upconverted filtered signal from the feedforward path to remove the jammer signal therefrom and thereby generate a signal with reduced jammer signal, wherein the means for adding comprises coupling the combined signal to a positive input of an adder and coupling the filtered signal to a negative input of the adder; and means, coupled to an output of the adder circuit, for mixing the signal with reduced jammer signal.

7. The circuit of claim 6 wherein the communication circuit is a quadrature circuit and the means for down converting comprises a quadrature mixer core that generates first and second quadrature components, wherein the means for filtering comprises means for filtering the first and second quadrature components to thereby generate first and second filtered signal portions, respectively, and the means for up converting comprising means for converting the first and second filtered signal portions to substantially the frequency of the jammer signal, the circuit further comprising means for combining the converted first and second signal portions.

8. A circuit for the reduction of distortion in a receiver configured to receive a radio frequency (RF) signal at a selected RF, the received RF signal being a combined signal containing a desired signal and an out of band jammer signal and a down-converter configured to convert the received RF signal to a selected lower frequency, the circuit comprising:

means, in a feedforward path, for filtering the combined signal at the selected lower frequency to remove the desired signal and retain at least the out of band jammer signal in a filtered signal;

means, in the feedforward path, for converting the filtered signal to the selected RF;

means for adding the received RF signal and the filtered RF signal from the feedforward path to remove the jammer signal to generate an RF signal with reduced jammer signal; and means, distinct from the downconverter, for frequency converting the RF signal with reduced jammer signal.

9. The circuit of claim 8 wherein the means for filtering comprises a highpass filter operating at baseband.

10. The circuit of claim 8 wherein the means for filtering comprises an analog filter.

11. The circuit of claim 8 wherein the receiver has a specified operational bandwidth and the means for filtering uses a filter bandwidth based on the operational bandwidth.

12. The circuit of claim 8 wherein the lower frequency comprises an intermediate frequency (IF).

13. The circuit of claim 8 wherein the means for filtering comprises an intermediate frequency (IF) bandpass filter.

14. The circuit of claim 8 wherein the means for frequency converting the RF signal with reduced jammer signal comprises means for frequency converting the RF signal with reduced jammer signal to substantially a baseband signal.

15. A method for the reduction of distortion in a wireless communication circuit having a combined signal including a desired signal and a jammer signal, the method comprising:

receiving a radio frequency (RF) signal at a selected RF, the received RF signal containing the desired signal and the jammer signal downconverting, in a feedforward path, at least a portion of the combined signal to substantially a combined lower frequency signal;

filtering, in the feedforward path, the combined lower frequency signal to remove the desired signal and thereby provide a filtered signal representative of the jammer signal;

upconverting, in the feedforward path, the filtered signal to an upconverted filtered signal at substantially a frequency of the jammer signal;

adding the combined signal and the upconverted filtered signal, from the feedforward path, to remove the jammer signal therefrom to produce a jammer canceled signal, wherein adding comprises coupling the combined signal to a positive input of an adder and coupling the filtered signal to a negative input of the adder; and downconverting the jammer canceled signal to generate a reduced distortion signal.

16. The method of claim 15 wherein the wireless communication circuit is a quadrature circuit and downconverting at least a portion of the combined signal comprises converting the received RF signal to first and second quadrature components at substantially baseband frequencies, filtering comprises filtering the first and second quadrature components, respectively, to thereby generate first and second filtered signal portions, respectively, and upconverting comprises converting the first and second filtered signal portions to the selected RF, the method further comprising combining the converted first and second filtered signal portions.

17. The method of claim 16 further comprising:
splitting the combined converted filtered signal portions into two signals for quadrature processing wherein the adding comprises adding a first of the two split signals and the combined signal and adding a second of the two split signals and the combined signal.

18. The method of claim 15 wherein the filtering is highpass filtering operating at baseband.

19. The method of claim 15 wherein the filtering is performed by an analog filter.

20. The method of claim 15 wherein the wireless communication circuit has a specified operational bandwidth and filtering uses a filter bandwidth based on the operational bandwidth.

21. The method of claim 15 wherein the lower frequency comprises an intermediate frequency (IF).

22. The method of claim 15 wherein filtering the combined lower frequency signal comprises separately filtering in-phase (I) and quadrature (Q) signal components of the combined lower frequency signal.

23. A system for the reduction of distortion in a wireless communication circuit having a combined signal including a desired signal and a jammer signal, comprising:
a radio frequency (RF) stage having an input configured to receive an RF signal and an output;
a four-way splitter having an input and first, second, third and fourth outputs, the four-way splitter input coupled to the RF stage output;
an adder comprising first and second adder portions, each adder portion having first and second inputs and an output, the outputs from the first and second adder portions providing reduced distortion output RF signals, the second inputs of the first and second adder portions being coupled to the third and fourth four-way splitter outputs, respectively;
a mixer comprising first and second mixer cores, each mixer core having an input, an output and an oscillator input, the first and second mixer inputs coupled to the first and second four-way splitter outputs, respectively;
a filter comprising first and second filter portions, each filter portion having an input and an output, the first and second filter inputs being coupled to the mixer first and second mixer outputs, respectively;
an up-mixer comprising first and second up-mixer portions, each up-mixer portion having an input, an output and an oscillator input, the first and second filter up-mixer inputs coupled to the first and second filter outputs, respectively;
a summer having first and second inputs and an output, the first and second inputs coupled to the first and second up-mixer outputs, respectively;
a two-way splitter having an input and first and second outputs, the input coupled to the summer output, the first and second two-way splitter outputs coupled to the first inputs of the first and second adder portions, respectively.

24. The circuit of claim 23 wherein the four-way splitter generates an output signal at the first and second outputs related to a gain factor and the signal at the four-way splitter input.

25. The circuit of claim 24 wherein the four-way splitter generates an output signal at the third and fourth outputs inversely related to the gain factor and the signal at the four-way splitter input.

* * * * *